United States Patent [19]
Bantien

[11] Patent Number: 5,259,247
[45] Date of Patent: Nov. 9, 1993

[54] SENSOR

[75] Inventor: Frank Bantien, Ditzingen, Fed. Rep. of Germany

[73] Assignee: Robert Bosch GmbH, Stuttgart, Fed. Rep. of Germany

[21] Appl. No.: 825,945

[22] Filed: Jan. 27, 1992

[30] Foreign Application Priority Data

Feb. 28, 1991 [DE] Fed. Rep. of Germany ....... 4106288

[51] Int. Cl.$^5$ ............................ G01L 7/08; G01L 9/12
[52] U.S. Cl. ..................................... 73/718; 73/724; 361/283.1
[58] Field of Search .................. 73/718, 724; 361/283; 29/25.35, 25.42

[56]  References Cited

U.S. PATENT DOCUMENTS

| 3,859,575 | 1/1975 | Lee et al. ............................... 73/724 |
| 4,507,973 | 4/1985 | Barr et al. ............................. 73/724 |
| 4,562,742 | 1/1986 | Bell ......................................... 73/724 |
| 4,719,538 | 1/1988 | Cox ....................................... 361/283 |
| 4,741,214 | 5/1988 | Vidmantas ............................ 73/724 |
| 4,951,510 | 8/1990 | Holm-Kennedy et al. ...... 73/862.04 |

FOREIGN PATENT DOCUMENTS 1622788  2/1989  U.S.S.R. ................................ 73/724

OTHER PUBLICATIONS

H. Guckel et al. of Univ. of Wisconsin Center for Applied Microelectronics, "Fine Grained Polysilicon and its Application to Planar Pressure Transducers", in Transducers '87 pp. 277-282.

Primary Examiner—Donald O. Woodiel
Attorney, Agent, or Firm—Frishauf, Holtz, Goodman & Woodward

[57]  ABSTRACT

A sensor for measuring pressure and acceleration is proposed; it has a monocrystalline silicon substrate (10) with a succession of thin films applied to its first primary surface. A deflectable membrane (12) in a frame (11) is structured out of the silicon substrate (10), and the membrane (12) is formed in the first primary surface. The membrane (12) has a reinforcement zone. In the succession of thin films that is applied to the first primary surface, there is a structure (50) having at least one first substructure, which is disposed parallel to the first primary surface of the silicon substrate (10). There is a gap between the first substructure and the silicon substrate (10). The first substructure is joined to the membrane (12) in the region of the reinforcement zone. It protrudes past the membrane (12) and extends at least partway over the frame (11). This first substructure forms one electrode of a capacitor. At least one first counterelectrode (161, 162) of the capacitor is disposed opposite the first substructure, in the region of the frame (11).

20 Claims, 3 Drawing Sheets

SENSOR

Cross-reference to related patents and applications, assigned to the assignee of the present invention, the disclosures of which are hereby incorporated by reference:

U.S. Pat. Nos. 4,522,067 and 4,620,365, BURGER;

U.S. Pat. No. 5,005,414, HOLLAND et al. (=DE-OS 38 14 950);

U.S. Pat. No. 4,955,234, MAREK, issued Sep. 11, 1990=DE 38 14 952;

U.S. Pat. No. 5,071,510 FINDLER & MUENZEL, issued Dec. 10, 1991, now U.S. Pat. No. 5,071,510, corresponding to German P 39 31 590.9 of Sep. 22, 1989 and German application P 40 02 472.0 of Feb. 6, 1990; now U.S. Pat. No. 5,151,763.

U.S. Ser. No. 07/631,623, MAREK, BANTIEN, HAACK & WARTH, corresponding to German Patent DE-PS 40 00 903 of Aug. 9, 1991, and re-filed as Ser. No. 07/893,904;

U.S. Ser. No. 07/716,817, MAREK, filed Jun. 17, 1991; corresponding to German P 40 22 464.3, filed Jul. 14, 1990;

German Patent Disclosure DE 36 09 841, filed Mar. 22, 1986, and Published International Application WO 87-05569, HEINTZ et al;

ENGELSDORF & METTNER, German Patent Disclosure DE-OS 39 19 876, publ. Dec. 20, 1990, and corresponding PCT/DE90/00366 publ. Dec. 27, 1990 as WO 90-15933; now U.S. Pat. No. 5,142,781;

U.S. Ser. No. 07/566,997, METTNER et al., filed Aug. 13, 1990, and corresponding PCT/EP90/01297, publ. as WO 91-02169; now U.S. Pat. No. 5,148,604;

German Patent Disclosure DE 40 16 471.3 and corresponding U.S. Ser. No. 07/701,781, BANTIEN, filed May 17, 1991;

German Patent Disclosure DE 40 28 402.6 and corresponding U.S. Ser. No. 07/750,893, MAREK & SEIPLER, filed Aug. 26, 1991;

German Patent Disclosure DE 40 41 578.3 and corresponding U.S. Ser. No. 07/792,390, MAREK, filed Nov. 15, 1991);

U.S. Ser. No. 07/800,491, METTNER, filed Nov. 29, 1991; now U.S. Pat. No. 5,178,190;

German Patent Disclosure DE 40 41 582.1 and corresponding U.S. Ser. No. 07/800,976, ROTHLEY, WOLF & ZABLER, filed Dec. 2, 1991.

Cross-Reference to other related patents:

U.S. Pat. No. 4,951,510, MULTIDIMENSIONAL FORCE SENSOR, HOLM-KENNEDY et al./UNIV. HAWAII, issued Aug. 28, 1990;

U.S. Pat. No. 4,581,624, O'CONNER/ALLIED, Apr. 3, 1986, entitled MICROMINIATURE SEMICONDUCTOR VALVE;

U.S. Pat. No. 4,836,023, OIKAWA/YAZAKI CORP., Jun. 6, 1989, entitled VIBRATIONAL ANGULAR RATE SENSOR;

U.S. Pat. Nos. 4,549,926 and 4,578,142, CORBOY JR. et al/RCA;

U.S. Pat. No. 4,585,513, GALE et al/RCA, issued Apr. 29, 1986;

U.S. Pat. No. 4,658,495, FLATLEY & IPRI/RCA, issued Apr. 21, 1987;

U.S. Pat. No. 4,698,132, DENNIS/RCA, issued Oct. 6, 1987;

German Patent DE-PS 36 25 411, SEIDEL, Nov. 11, 1988, assigned to Messerschmidt-Bölkow-Blohm GmbH.

Cross-reference to related literature:

Walter Kern, "Chemical Etching of Silicon, Germanium, Gallium Arsenide, and Gallium Phosphide", RCA REVIEW, June 1978, Vol. 39, pp. 278–308.

W. C. Tang et al., "Laterally Driven Polysilicon Resonant Microstructures", Vol. 20, Sensors & Actuators, pages 53–59, IEEE 1989.

H. Guckel et al. of Univ. of Wisconsin Center for Applied Microelectronics, "Fine Grained Polysilicon and its Application to Planar Pressure Transducers", in *Transducers '87*, pp. 277–282.

FIELD OF THE INVENTION

The invention relates generally to a sensor for measuring pressure or acceleration, which has a monocrystalline silicon substrate with a succession of thin films applied to its first primary surface, and, more particularly, to a structure wherein at least a first substructure is formed in these films, the first substructure is oriented parallel to the first primary surface of the silicon substrate, and there is a gap between the first substructure and the primary surface.

BACKGROUND

"Fine Grained Polysilicon and its Application to Planar Pressure Transducers", H. Guckel et al., *Transducers '87*, pp. 277–282, describes a process for producing pressure sensors by surface micromechanics in which three-dimensional sensor structures, such as thin membrane, tongue or bridge structures, are produced in a succession of thin films deposited on a monocrystalline silicon substrate. The deflectable or deformable sensor structures are produced by first applying a structured silicon layer to the substrate, then depositing a polysilicon layer on top of that. Structuring the polysilicon layer and lateral undercutting, in the process of which the structured silicon oxide layer is removed, exposes the sensor structure in the polysilicon layer. This article also studies the effects of various parameters of the production process on the material properties of the sensor structure. The mode of operation and reliability of such sensors are decisively dependent on the properties, such as the modulus of elasticity, of the material from which the deflectable or deformable components of the sensor are made.

German Patent Application P 40 22 495.3 filed fall 1990, entitled Mikromechanischer Drehratensensor, the publication date of which does not predate the present application, also discloses a process for producing sensor structures in three-layer silicon wafers, in which retaining webs for a vibratable seismic mass are formed in the two outer layers.

THE INVENTION

Briefly, the sensor according to the invention has a movable membrane that is structured from a monocrystalline silicon substrate and has a reinforcement zone and that can be produced simply and with good replicability by processes of volume micromechanics. The membrane is formed in the first primary surface of the silicon substrate onto which a succession of thin films is applied. In these films, a structure having at least one first substructure is formed, which is oriented parallel to the silicon substrate; this can be particularly advantageously done by surface micromechanics. The first substructure forms one electrode of a capacitor and is joined to the membrane in the region of the reinforcement zone. It extends at least partway past the membrane as far as the solid frame of the membrane, where there is at least one counterelectrode of the capacitor.

This sensor not only combines the advantages of sensors made by volume micromechanics with those of sensors made by surface micromechanics, but avoids the disadvantages of those methods.

The spacings between the electrodes of the capacitor are very small, because of the good process properties of surface micromechanics. As a result, sensors with a small structural size and a high off-load capacitance relative to the structural size can be made. It is particularly advantageous that acceleration or pressure that acts on the sensor cause a deformation of the monocrystalline membrane, yet the substructure serving as the electrode is not deformed. The substructure is deflected toward the frame and all the structures secured there, in particular the counterelectrodes, however, because it is fixed in the region of the reinforcement zone of the membrane, and this deflection is capacitively detected. Accordingly, the structures applied to the silicon substrate by surface micromechanics are not deformed, but serve instead solely to detect deformation of the monocrystalline membrane. The rigidity of this membrane depends primarily on the very well-defined material parameters of the monocrystalline silicon, so that sensors having a defined, replicable sensitivity can be produced simply. Moreover, this simple sensor design is IC-compatible (Integrated Circuit-compatible).

The sensor of the invention has other advantageous features as well. In a simple manner, with a second substructure, it attains a measurement-signal-reinforcing differential capacitor arrangement that makes do without an additionally bonded wafer. It is especially advantageous to structure the surface structure of the sensor from a layer of polysilicon or monocrystalline silicon, because techniques for this are well-known and easy to handle. It is also advantageous to structure the membrane such that it has an additional mass in the region of the reinforcement zone. This prevents unintended deformation of the membrane in the region of the reinforcement zone, on the one hand, and on the other serves to reinforce and linearize the measurement effect.

Using a silicon substrate that has a plurality of layers, with a dopant junction between them, is especially advantageous for structuring the silicon substrate by anisotropic etching. The electric leads of the capacitor electrodes, along with the counterelectrodes disposed on the first primary surface of the silicon substrate, can be made simply, in the form of diffusions in the first primary surface of the silicon substrate.

For the function of the sensor of the invention, it is especially advantageous to hermetically seal off the surface structure of the sensor on the first primary surface of the silicon substrate; this is done with a cap, preferably of polysilicon or monocrystalline silicon. A defined pressure, preferably a vacuum, prevails inside the cap and defines the damping of the sensor. The cap also serves as protection against contamination and destruction of the sensor by external influences.

To prevent the electrodes of the capacitor arrangement from sticking together, for example from adhesion, a low-voltage passivation layer, preferably a nitride layer, is applied to the surface structure on all sides, and to the first primary surface of the silicon substrate at least in the region of this structure.

It is especially advantageous to make the capacitor structure of the sensor solely in the silicon substrate surface, and to make only one polysilicon layer. For a differential capacitor arrangement, this is done according to the invention by making the middle electrode partly in the form of a surface structure and partly in the first primary surface of the silicon substrate; a first counterelectrode is diffused into the primary silicon substrate surface underneath the part of the middle electrode embodied as a surface structure, and the second counterelectrode is formed as a firmly fastened surface structure above the part of the middle electrode that is diffused into the first primary surface of the silicon substrate in the region of the reinforcement zone.

If the sensor according to the invention is used as an acceleration sensor, it is advantageous to provide the membrane with apertures around the additional mass, so that the additional mass is suspended only from webs formed in the membrane. To reduce the shear sensitivity of such an acceleration sensor, the additional mass is additionally joined to the frame at fastening webs on the underside of the second primary surface of the silicon substrate.

It is advantageous to provide for continuous functional monitoring of the acceleration sensor. To this end, a lower covering is applied to the underside of the silicon substrate and has a cavern in the region of the additional mass. A first excitation electrode is disposed in the region of the additional mass on the underside of the sensor. Opposite it on the bottom face of the cavern is a second excitation electrode. Means are also provided for applying a voltage between the two excitation electrodes; this can electrostatically deflect the additional mass. This deflection is then detected like an acceleration, with the aid of the structure disposed on the surface of the silicon substrate. This continuous functional monitoring is especially advantageous for acceleration sensors in security systems.

DRAWINGS

FIG. 1 is a perspective section through a sensor;
FIG. 2 is a section through a further sensor;
FIG. 3 is a top view on the sensor of FIG. 2;
FIG. 4 is a section through a sensor of FIG. 2 and 3 having a cap;
FIG. 5 is a section through an acceleration sensor; and
FIG. 6 is a section through an acceleration sensor of FIG. 5 with functional monitoring.

DETAILED DESCRIPTION

Figure 1:
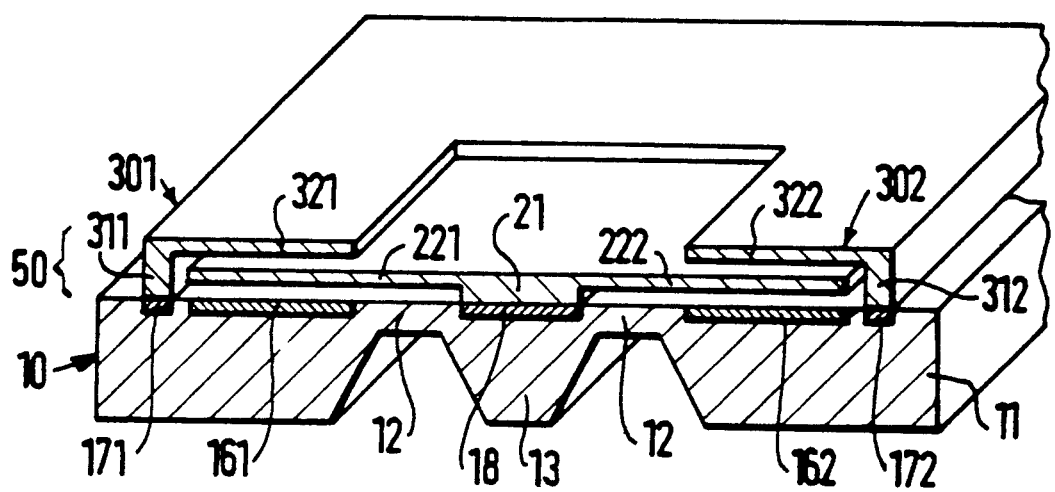

FIG. 1 shows a monocrystalline Silicon substrate 10. It may comprise one layer, as in this example, or more than one layer, with dopant junctions between the layers. The silicon substrate 10 is structured so that it has a frame 11 and a membrane 12. The membrane 12 is formed in the first primary surface of the silicon substrate 10 and in its middle region has a reinforcement zone, in which an additional mass 13 is formed. By imposing an acceleration or a pressure orthogonal to the substrate plane, the membrane is deflected, with deformation of its peripheral regions. A structure 50, which has a plurality of substructures, is applied to the first primary surface of the silicon substrate 10. The structure 50 is preferably made of polysilicon layers or monocrystalline silicon layers. Processes for producing such structures are adequately known from the prior art, so their production will not be discussed in further detail here. A first substructure of the structure 50 is formed by a pedestal 21, at which tongues 221 and 222 originate, which are oriented parallel to the first primary surface of the silicon substrate. The first substructure may also be formed by a pedestal 21 having a cover plate, which protrudes past the pedestal on all sides and has the same function as the tongues 221 and 222. The pedestal 21 is disposed in the region of the reinforcement zone of the membrane 12; the tongues 221 and 222 protrude past the membrane 12 across part of the frame 11. A gap exists between the tongues 221 and 222 in the first primary surface of the silicon substrate 10. Two further substructures of the structure 50 are formed by pedestals 311 and 312, disposed in the region of the frame 11 and from each of which one tongue 321 and 322 originates. These tongues 321 and 322 are likewise oriented parallel to the first primary surface of the silicon substrate, but they point in the direction of the membrane 12. Because of the height of the pedestals 311 and 312, they protrude past the tongues 221 and 222 of the first substructure. A gap likewise exists between the tongues 221 and 222 of the first substructure and the tongues 321 and 322 of the second substructure. The first substructure having the tongues 221 and 222 forms the middle electrode of a differential capacitor. It is provided with electrical contact via a supply line 18 in the form of a lead diffusion in the region of the pedestal 21 in the first primary surface of the silicon substrate 10. Respective diffused-in counterelectrodes 161 and 162 are located in the first primary surface of the silicon substrate 10, opposite the tongues 211 and 222 of the first substructure. However, these counterelectrodes 161, 162 may also be made differently, for instance in the form of surface metallizations. The two further substructures form the second counterelectrodes 301 and 302 of the differential capacitor. They are likewise provided with electrical contact by supply lines 171 and 172, which are diffused into the first primary surface of the silicon substrate 10 in the region of the pedestals 311 and 312.

A force acting orthogonally to the substrate plane upon the sensor shown in FIG. 1 causes a deflection of the membrane 12, with deformation of the peripheral regions of the membrane 12. In this process, the spacings between the tongues 221, 222 acting as the middle electrode and the first counterelectrodes 161, 162 or the second counterelectrodes 301 and 302 also vary. These changes in spacing are detected as changes in capacitance of the differential capacitor. It should especially be noted that the structure 50, in particular the middle electrode and the counterelectrodes, does not deform. The only structures that are deformed are the monocrystalline silicon membrane 12, the material of which does not exhibit any fatigue phenomena, and which can be produced very simply and replicably.

Figure 2:
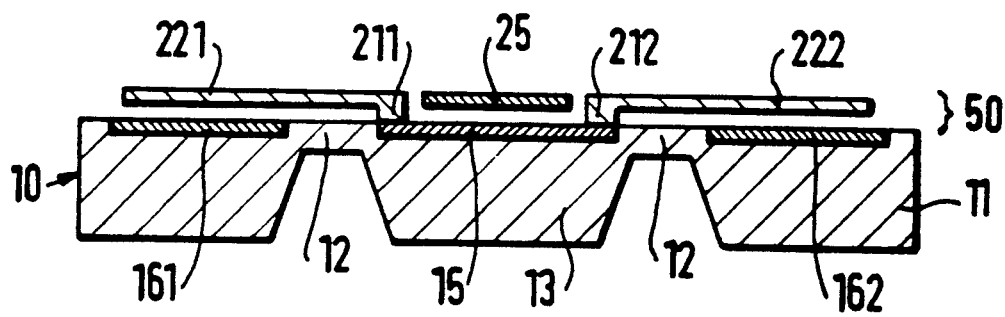

The sensor shown in FIG. 2 has a silicon substrate 10, which is structured precisely like the silicon substrate 10 of the sensor shown in FIG. 1. The same reference numerals will therefore be used for the corresponding structural elements below. A structure 50 of preferably polysilicon or monocrystalline silicon is again applied to the silicon substrate 10. The structure 50 has two first substructures, each comprising a pedestal 211 and 212 and tongues 221 and 222 originating at the pedestals.

The two first substructures are each applied to the first primary surface of the silicon substrate 10 at the edge of the reinforcement zone of the membrane 12, via the pedestals 211 and 212. The tongues 221 and 222 are oriented parallel to the first primary surface of the silicon substrate 10 and protrude over the frame 11 past the membrane 12. Between the tongues 221, 222 and the first primary surface of the silicon substrate 10 is a gap. The two first substructures are conductively joined together via an electrode 15 diffused into the membrane 12 in the region of the reinforcement zone. First counterelectrodes 161 and 162 are diffused into the primary surface of the silicon substrate 10, each one opposite a respective tongue 211, 222, in the region of the frame 11. However, the electrodes 15, 161 and 162 can also be made in other ways, for example by means of further polysilicon layers.

A second counterelectrode 25 is formed by a further substructure of the structure 50. This counterelectrode 25 extends in the manner of a bridge from one side of the frame 11 to the opposite side of the frame 11 across the reinforcement zone of the membrane 12, between the pedestals 211 and 212 of the two first substructures.

In this sensor, the two first substructures with the tongues 221 and 222 and the pedestals 211 and 212, together with the electrode 15 diffused into the membrane, serve as the middle electrode of the differential capacitor. The first counterelectrodes 161 and 162 of the differential capacitor are disposed on the surface of the frame 11. The second counterelectrode 25 is disposed above the electrode 15 that is diffused into the membrane 12.

A deflection of the membrane 12 upon the exertion of the force orthogonal to the substrate surface, as in the case of the sensor shown in FIG. 1, causes a change in spacing between the tongues 221, 222, which are parts of the middle electrode of the differential capacitor, and the first counterelectrodes 161, 162. Moreover, the spacing between the membrane 12 and the second counterelectrode 25 also changes, the electrode 15 being disposed as part of the middle electrode on the surface of the membrane 12. Accordingly, the deflection of the membrane 12 is again detected capacitively by means of a differential capacitor arrangement. In contrast to the sensor shown in FIG. 1, the structure 50 of the sensor shown in FIG. 2 is formed substantially in only one further layer deposited on the first primary surface of the silicon substrate 10. With this embodiment of the structure 50, by comparison with the embodiment shown in FIG. 1 of the structure 50, method steps in producing the sensor can be dispensed with.

Figure 3:
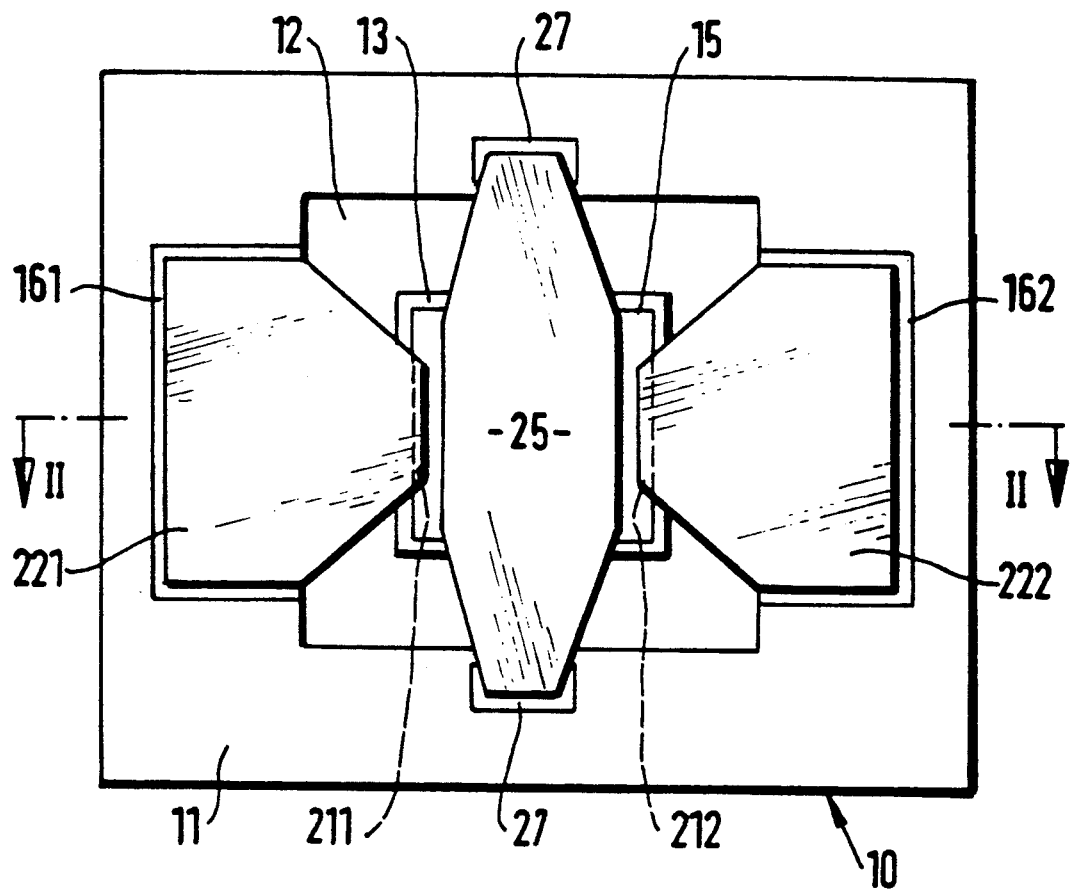

FIG. 3 shows a top view on a sensor of FIG. 2. Although the first primary surface of the silicon substrate 10 is shown with the structure 50 applied to it, only the regions of the frame 11, the membrane 12 and the reinforcement zone and the additional mass 13 are specifically identified. The tongues 221 and 222 of the first substructures originate at the pedestals 211, 212 of the first substructures, the pedestals being disposed at the edge of the reinforcement zone, and are embodied in the form of paddles. They protrude past the region of the membrane 12 and extend partway over regions of the frame 11. The first counterelectrodes 161 and 162 are each disposed opposite the respective tongues 221 and 222 on the frame 11. The second substructure forming the second counterelectrode 25 extends in bridgelike fashion from one side of the frame 11 to the opposite side of the frame 11, across the membrane 12. It can be provided with electrical contact by lead diffusions 27, for example. The second counterelectrode 25 is disposed between the pedestals 211 and 212 of the first substructures and above the electrodes 15 disposed in the region of the reinforcement zone, the electrode generating a conductive connection between the two first substructures. The two first substructures and the second substructure are in this example structured from the same layer.

Figure 4:
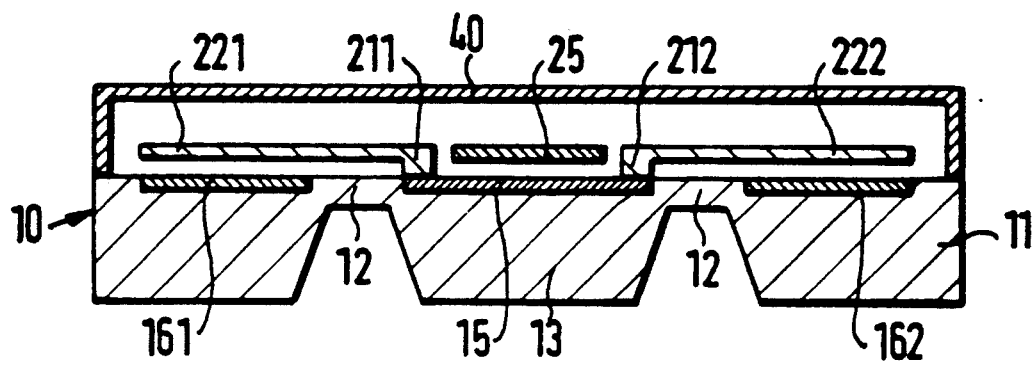

FIG. 4 shows a sensor corresponding to FIGS. 2 and 3 that has a cap 40. This cap may for instance be made by means of a polysilicon layer or a monocrystalline silicon layer, which protrudes past the entire sensor structure and hermetically seals it. A defined pressure, for instance a vacuum, can accordingly be established inside the cap 40 and defines the damping behavior of the sensor.

Figure 5:
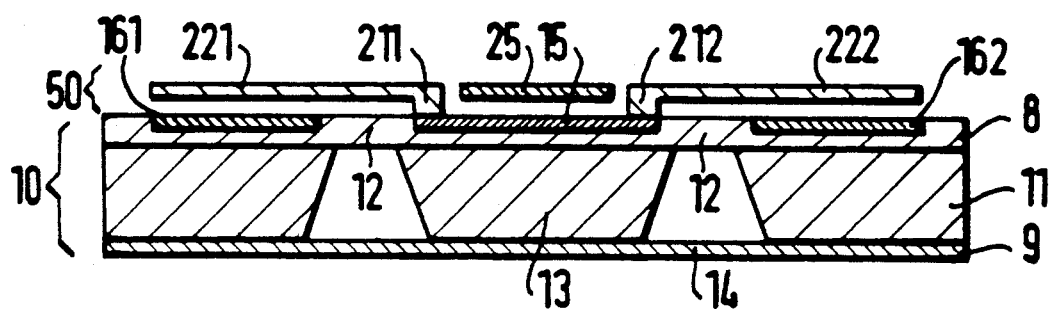

FIG. 5 shows the embodiment of a sensor according to the invention as an acceleration sensor, having a structure 50 corresponding to FIGS. 2 and 3. Here, the silicon substrate 10 has an upper layer 8, in which parts of the membrane 12 are formed. A lower layer 9, preferably also a monocrystalline silicon layer, is applied to the underside of the silicon substrate 10. For the use of the sensor as an acceleration sensor, the membrane 12 is locally etched through, so that the additional mass 13 is now suspended only from webs that are formed in the membrane 12. The additional mass 13, serving as a seismic mass, has a center of gravity that is not located in the plane of the membrane 12, and so the seismic mass 13 is additionally joined to the frame 11 by fastening webs 14 formed in the lower layer 9. This provision reduces the sensitivity of the sensor to shear accelerations. Making such structures with the aid of dual-sided pn etch stop limits is already known from the prior art.

Figure 6:
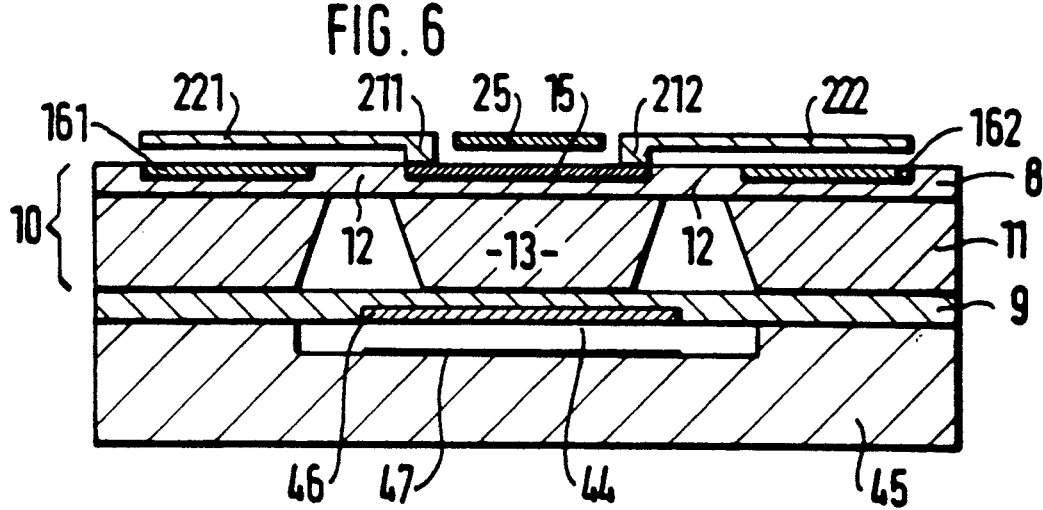

FIG. 6 shows an acceleration sensor corresponding to FIG. 5, on the underside of which a lower covering 45 is applied; this covering may be embodied for instance by a silicon wafer or a glass substrate. In the region of the additional mass 13 and fastening webs 14, the lower covering 45 has a cavern 44. A first excitation electrode 46 is disposed in the region of the additional mass 13 on the lower layer 9 and can be made for instance by diffusion or by means of a metallization. A second excitation electrode 47, for instance likewise in the form of a metallization, is applied to the bottom face of the cavern 44, opposite the first excitation electrode 46. By applying a voltage between the excitation electrodes 46 and 47, the additional mass 13 is electrostatically deflected. This deflection can be detected like an acceleration, with the aid of the differential capacitor structure on the top of the silicon substrate 10. Since the excitation electrodes 46 and 47 are separate from the differential capacitor arrangement, this functional monitoring of the sensor is also possible while the sensor is in operation, which is especially advantageous for acceleration sensors in security systems and airbag triggering.

To keep the electrodes made by surface micromechanics from "sticking together" in the capacitor structures shown in FIGS. 1-6 for the sensor according to the invention, it is suitable to deposit a low-voltage passivation layer, preferably a nitride layer, on all sides over the entire capacitor structure and on the first primary surface of the silicon substrate in the regions of the surface structure. This avoids short-circuiting of the sensor from adhesion or an overload.

Various changes and modifications may be made, and features described in connection with any one of the embodiments may be used with any of the others, within the scope of the inventive concept.

I claim:

1. A sensor for measuring pressure or acceleration, which has a monocrystalline silicon substrate with a succession of thin films applied to its first primary surface, wherein a structure having at least a first substructure is formed in these films, so that the first substructure is oriented parallel to the first primary surface of the silicon substrate, and there is a gap between the first substructure and the primary surface, characterized in that the silicon substrate (10) is structured and has a frame (11) with a deflectable membrane (12) formed in the first primary surface;

that the membrane (12) has a reinforcement zone;

that the first substructure is joined to the membrane (12) in the region of the reinforcement zone;

that the first substructure extends past the membrane (12) at least partway over the frame (11);

that the first substructure forms an electrode of a capacitor; and that at least one first counterelectrode (161, 162) of the capacitor is disposed in the region of the frame (11) opposite the first substructure.

2. The sensor of claim 1, characterized in that
   at least one second substructure is present, which is joined to the silicon substrate (10) in the region of the frame (11);
   and that the at least one second substructure forms at least one second counterelectrode for the electrode, so that the at least one second counterelectrode together with the at least one first counterelectrode (161, 162) and the electrode, as a middle electrode, form a differential capacitor.

3. The sensor of claim 1, characterized in that
   the structure (50) is structured from a layer of polysilicon or a layer of monocrystalline silicon.

4. The sensor of claim 1, characterized in that
   the membrane (12) in the region of the reinforcement zone, has an additional mass (13).

5. The sensor of claim 1, characterized in that
   the silicon substrate (10) has an upper layer (8), in which portions of the membrane (12) are formed.

6. The sensor of claim 1, characterized in that
   the electric leads of the electrodes of the capacitor are diffused into the first primary surface of the silicon substrate (10).

7. The sensor of claim 1, characterized in that
   the at least one counterelectrode (161, 162) of the capacitor is diffused into the first primary surface of the frame (11).

8. The sensor of claim 1, characterized in that
   the structure (50) is hermetically sealed off by a cap (40), of preferably polysilicon or monocrystalline silicon, applied to the first primary surface of the silicon carrier (10).

9. The sensor of claim 8, characterized in that
   a defined pressure, preferably a vacuum, prevails inside the cap (40).

10. The sensor of claim 1, characterized in that
    a low-voltage passivation layer, preferably a nitride layer, is applied on all sides to all the substructures of the structure (50) and to the first primary surface of the silicon substrate (10), at least in the region of the structure (50).

11. The sensor of claim 1, characterized in that
    the at least one substructure has at least one pedestal (311, 312), from which at least one second counterelectrode (301, 302), embodied in tongue-like fashion, begins, wherein the at least one second substructure is joined to the frame (11) via the at least one pedestal (311, 312);

and that the at least one second counterelectrode is oriented parallel to the first substructure forming the middle electrode and extends at least part way past it.

12. The sensor of claim 1, characterized in that
the at least one first substructure has a pedestal (211, 212), from which at least one movable middle electrode (221, 222), formed in a tongue shape, begins, that at least one first substructure is joined to the membrane (12) via the at least one pedestal (211, 212);

that the at least one pedestal (211, 212) is disposed on the outer rim of the reinforcement zone, and the at least one movable middle electrode (221, 222) is oriented parallel to the first primary surface of the silicon substrate (10) and protrudes past the frame (11);

that at least one electrode (15), which is in conductive contact with the at least one movable middle electrode (221, 22) is disposed on the membrane (12), in the region of the reinforcement zone;

and that above the at least one electrode (15), next to the at least one pedestal (211, 212) of the at least one first substructure, a bridge-like second counter electrode (25) firmly joined on two sides to the frame (11) is disposed, serving as at least one second substructure.

13. The sensor of claim 4, characterized in that
the membrane (12) is pierced around the additional mass (13), so that the additional mass (13) is suspended only from webs embodied in the membrane (12).

14. The sensor of claim 4, characterized in that
a lower layer (9), preferably a monocrystalline silicon layer, is applied to the second primary surface of the silicon substrate (10);

and that fastening webs (14), which join the additional mass (13) to the frame (11), are formed in the lower layer (9).

15. The sensor of claim 14, characterized in that
a lower covering (45), which has a cavern (4) in the region of the additional mass (13), is applied against the lower layer (9);

that at least one first excitation electrode (46) is disposed in the lower layer (9) in the region of the additional mass (13);

that at least one second excitation electrode (47) is disposed on the bottom face of the cavern (44), opposite the at least one first excitation electrode (46);

and that means are provided for applying a voltage between the excitation electrodes (46, 47).

16. The sensor of claim 15, characterized in that
the lower covering (45) is formed by a glass or silicon substrate.

17. The sensor of claim 1, characterized in that
a pressure lead is disposed on the second primary surface of the silicon substrate (10).

18. The sensor of claim 2, characterized in that
a pressure lead is disposed on the second primary surface of the silicon substrate (10).

19. The sensor of claim 3, characterized in that a pressure lead is disposed on the second primary surface of the silicon substrate (10).

20. The sensor of claim 4, characterized in that
a pressure lead is disposed on the second primary surface of the silicon substrate (10).

* * * * *